United States Patent
Okamoto et al.

(10) Patent No.: US 8,788,621 B2
(45) Date of Patent: Jul. 22, 2014

(54) METHOD, DEVICE, AND COMPUTER PRODUCT FOR MANAGING COMMUNICATION SITUATION

(75) Inventors: Masayuki Okamoto, Kanagawa (JP); Naoki Iketani, Kanagawa (JP); Hideo Umeki, Kanagawa (JP); Sogo Tsuboi, Kanagawa (JP); Kenta Cho, Tokyo (JP); Keisuke Nishimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1361 days.

(21) Appl. No.: 12/045,249

(22) Filed: Mar. 10, 2008

(65) Prior Publication Data
US 2008/0244056 A1    Oct. 2, 2008

(30) Foreign Application Priority Data
Mar. 27, 2007  (JP) .................. 2007-082619

(51) Int. Cl.
*G06F 15/16*  (2006.01)
*G06F 15/173*  (2006.01)

(52) U.S. Cl.
USPC ........................ 709/218; 709/223; 709/227

(58) Field of Classification Search
USPC .................................................. 709/218
See application file for complete search history.

(56) References Cited

U.S. PATENT DOCUMENTS

| | | | |
|---|---|---|---|
| 7,447,608 B1 * | 11/2008 | Poston et al. ................ | 702/178 |
| 2003/0217096 A1 * | 11/2003 | McKelvie et al. ............ | 709/202 |
| 2003/0234772 A1 * | 12/2003 | Zhang et al. ................. | 345/177 |
| 2006/0053194 A1 * | 3/2006 | Schneider et al. ........... | 709/204 |
| 2007/0120871 A1 | 5/2007 | Okamoto et al. | |
| 2008/0077869 A1 | 3/2008 | Cho et al. | |
| 2008/0079693 A1 | 4/2008 | Okamoto et al. | |

FOREIGN PATENT DOCUMENTS

| | | |
|---|---|---|
| JP | 2001-331614 | 11/2001 |
| JP | 2004-258802 | 9/2004 |
| JP | 2005117155 | 4/2005 |
| JP | 2006302045 | 11/2006 |

OTHER PUBLICATIONS

Japanese Office Action for 2007-082619 mailed on Jan. 26, 2010.
Japanese Office Action dated Sep. 29, 2009 corresponding to U.S. Appl. No. 12/045,249, filed Mar. 10, 2008.
Yamaguchi, T., et. al; Total Information Management Method for Formal Communication Situations From Personal Viewpoint, Transactions of Information Processing Society of Japan, Nov. 1993, vol. 34, No. 11, pp. 2329-2343.

* cited by examiner

*Primary Examiner* — Noel Beharry
(74) *Attorney, Agent, or Firm* — Amin, Turocy & Watson, LLP

(57) ABSTRACT

An action acquiring unit acquires action information corresponding to operation information from a first storage unit for a first user, and stores acquired action information in a third storage unit. A receiving unit receives, via a network, action information of a second user from an external device. A situation acquiring unit acquires, from a second storage, a communication situation corresponding to received action information. A writing unit writes the action information of the first user indicated by the communication situation to the third storage unit, additionally.

12 Claims, 9 Drawing Sheets

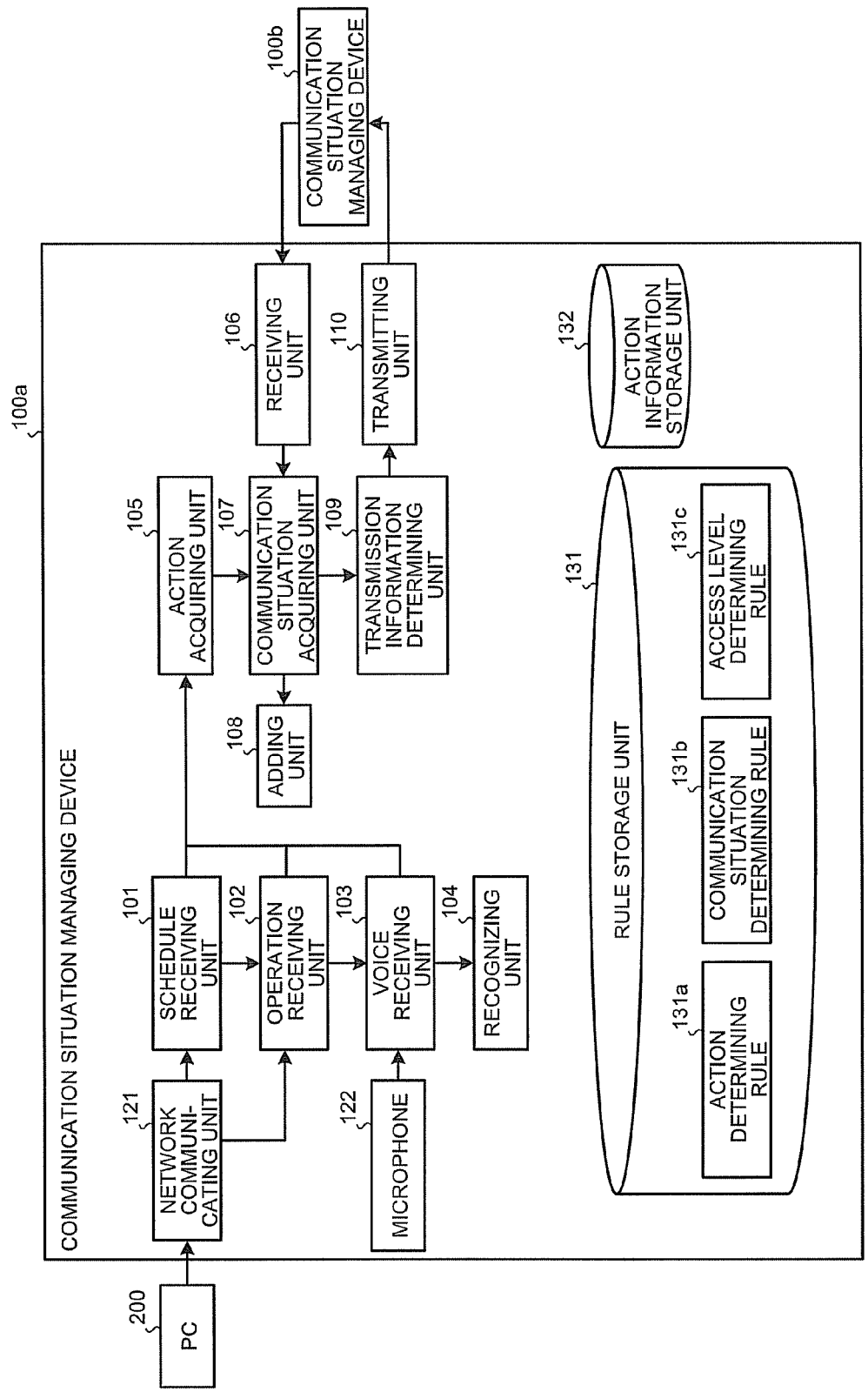

RULE 1:
    CONDITION: (MEETING SCHEDULED FOR CURRENT TIME IN SCHEDULE)
    ACTION: ATTENDING MEETING (ATTENDEES LISTED IN MEETING INFORMATION)

RULE 2:
    CONDITION: (OPERATION MADE ON APPLICATION FOR DISPLAYING DOCUMENT x WITHIN 1 MINUTE)
    AND
    (30-SECOND OR LONGER UTTERANCE MADE WITHIN 1 MINUTE)
    ACTION: EXPLANATION GIVEN ON DOCUMENT x)

RULE 3:
    CONDITION: (3-SECOND OR LONGER UTTERANCE IMMEDIATELY BEFORE)
    ACTION: UTTERING

RULE 1:
    CONDITION: PARTNER a EXPLAINING DOCUMENT x
    ACTION: RECEIVING EXPLANATION ON DOCUMENT x FROM a

RULE 2:
    CONDITION: SCHEDULED ATTENDEE a BEING PRESENT FOR 5 MINUTES OR LONGER
    ACTION: ATTENDING SCHEDULED MEETING TOGETHER WITH a
    (ALSO REGARDED AS ATTENDING MEETING TOGETHER WITH a SINCE 5 MINUTES BEFORE)

RULE 3:
    CONDITION: UTTERANCES SHIFTING BETWEEN a AND ONESELF FOR LAST 5 MINUTES WITHOUT OVERLAPPING
    ACTION: HAVING CONVERSATION WITH a
    (ALSO TRANSMIT COMMUNICATION SITUATION FOR LAST 5 MINUTES TO CONVERSATION PARTNER)

RULE 1:
    CONDITION: PARTNER a IS LISTED IN REGISTRATION LIST
    ACTION: ACCESSIBLE WITHOUT CONDITION

RULE 2:
    CONDITION: PARTNER a IS MEETING ATTENDEE LISTED IN
               SCHEDULE INFORMATION
    ACTION: NAME OF FILE AND PRESENTED PAGES ARE ACCESSIBLE

RULE 3:
    CONDITION: PARTNER a IS MEETING ATTENDEE NOT LISTED IN
               SCHEDULE INFORMATION
    ACTION: ONLY ID IS TRANSMITTED

| START TIME AND DATE | END TIME AND DATE | ACTION | NAME OF MEETING | PLACE | PARTNER | DOCUMENT ID | NAME OF DOCUMENT | ACCESS LEVEL |
|---|---|---|---|---|---|---|---|---|
| ... | ... | ... | ... | ... | ... | ... | ... | ... |
| 20060921 17:15:39 | | OPEN DOCUMENT | | | | abc | AA-PROPOSAL.DOC | |
| 20060921 17:16:20 | 20060921 17:18:40 | EDIT DOCUMENT | | | | abc | AA-PROPOSAL.DOC | |
| ... | | | | | | | | |
| 20060922 18:59:30 | | SAVE DOCUMENT | | | | abc | AA-PROPOSAL.DOC | |
| ... | ... | ... | ... | ... | ... | ... | ... | ... |

FIG.6

| START TIME AND DATE | END TIME AND DATE | NAME | PLACE | ATTENDEE ID LIST |
|---|---|---|---|---|
| 20060922 10:00 | 20060922 12:00 | BB-PJ | CONFERENCE ROOM A | (suzuki, sato, tanaka) |
| 20060927 13:15 | 20060927 14:15 | CC-DEVELOPMENT | CONFERENCE ROOM B | (suzuki, yamada, saitoh) |
| ... | ... | ... | ... | ... |

FIG.8

| START TIME AND DATE | END TIME AND DATE | ACTION | NAME OF MEETING | PLACE | PARTNER | DOCUMENT ID | NAME OF DOCUMENT | ACCESS LEVEL |
|---|---|---|---|---|---|---|---|---|
| 20060922 10:00:05 | 20060922 10:00:12 | SPEECH | | | | | | |
| ⋮ | ⋮ | ⋮ | ⋮ | ⋮ | ⋮ | abc | ⋮ | ⋮ |
| 20060922 10:03:12 | | PRESENTING DOCUMENT | | | | | AA-PROPOSAL.DOC | DOCUMENT ID ONLY |
| ⋮ | ⋮ | ⋮ | ⋮ | ⋮ | ⋮ | ⋮ | ⋮ | ⋮ |

| START TIME AND DATE | END TIME AND DATE | ACTION | NAME OF MEETING | PLACE | PARTNER | DOCUMENT ID | NAME OF DOCUMENT | ACCESS LEVEL |
|---|---|---|---|---|---|---|---|---|
| 20060922 10:00:05 | 20060922 10:00:12 | SPEECH | BB-PJ | CONFERENCE ROOM A | tanaka | | | |
| 20060922 10:00:15 | 20060922 10:00:30 | LISTENING TO EXPLANATION | BB-PJ | CONFERENCE ROOM A | tanaka | | | |
| ... | ... | ... | ... | ... | ... | ... | ... | ... |
| 20060922 10:03:12 | | PRESENTING DOCUMENT | | | | abc | AA-PROPOSAL.DOC | DOCUMENT ID ONLY |
| 20060922 10:03:20 | | DISPLAYING PAGE 3 | | | | abc | | |
| ... | ... | ... | ... | ... | ... | ... | ... | ... |
| 20060922 10:18:30 | | BEING PRESENTED DOCUMENT | | | tanaka | xyz | | DOCUMENT ID ONLY |
| 20060922 10:25:30 | | PRESENTING DOCUMENT | | | | def | AA-DIAGRAM.PPT | DOCUMENT ID ONLY |
| ... | ... | ... | ... | ... | ... | ... | ... | ... |

| NAME OF FILE | | SEARCH RESULTS | | |
|---|---|---|---|---|
| | | NAME OF FILE | TYPE | LAST UPDATE |
| TYPE OF FILE | ▽ | abc | ONLY ID | 20060922 |
| | | DEVELOPMENT-TABLE.XLS | TABULAR FILE | 20060923 |
| PLACE | ▽ | | | |
| PARTNER 1001 | | | | |
| SUZUKI | ▽ | | | |
| SITUATION 1002 | | | | |
| BEING PRESENTED DOCUMENT | ▽ | | | |
| TIME AND DATE | | | | |
| 2006/09/21 00:00 ▽ FROM | | | | |
| 2006/09/23 18:00 ▽ TO | | | | |
| 1003 SEARCH | | END | | |

METHOD, DEVICE, AND COMPUTER PRODUCT FOR MANAGING COMMUNICATION SITUATION

CROSS-REFERENCE TO RELATED APPLICATIONS

This application is based upon and claims the benefit of priority from the prior Japanese Patent Application No. 2007-082619, filed on Mar. 27, 2007; the entire contents of which are incorporated herein by reference.

BACKGROUND OF THE INVENTION

1. Field of the Invention

The present invention relates to a method, a device, and a computer product for managing a communication situation between users of operation terminals or the like.

2. Description of the Related Art

Recently, audio/graphics/video input devices, sensors, and displays, as well as electronic information operating devices including personal computers have been increasingly employed in communication settings such as conversations among users and meetings in which a numbers of users participate. When making a presentation, for example, data is projected by use of a projector, a personal computer monitor, or the like so that the data can be referred to during the talk or discussion. By use of an electric whiteboard, additional data can be written onto the presented information by detecting the position of a pen or fingertip that is placed for an operation on the electric whiteboard.

After such communication activities, or even during the activities, there may be a request for checking remarks made in the past or for finding a particular document. With a conventional technology, one has to remember the date and time of the past communication activity to search for a note, a document, or the minutes of the meeting that have been made before. Thus, the search is not very efficiently conducted.

On the other hand, if communication situations including explanations and presentations are organized in such a manner as "last week's explanation given from A to B" and "document provided by a participant in last meeting", a search can be made by use of the communication situations. Such a technology would be preferable because the process procedure is similar to the behavioral pattern of a human being.

Furthermore, one may wish to check the history of the communications, asking whether person C has discussed a document regarding matter D. Thus, there is a need of managing communication situations in a manner that the communication situations can be individually recognized.

When a search is conducted by use of a communication situation, the following problem tends to be incurred. For instance, because a person to whom a document is presented often does not have information necessary to specify the document such as the name of the file, the person would use the communication situation as the only keyword, asking to send the document used in the meeting or to give the person some information on the document used in the meeting.

In response to the request as the above case the presenter of the documents may not be able to determine which document is requested if multiple documents that look alike are present, or if multiple documents are provided in one meeting. For this reason, it is preferable that the communication situations be managed by associating documents used in a communication activity with identifiable information.

As a method of reducing costs of searching for a document in relation to a communication activity in the past, technologies of co-managing documents and objects that are referred to afterward, within a group or the like. For instance, JP-A 2004-258802 (KOKAI) suggests a technology of managing and providing the history of operations made on objects such as documents. This operation history includes the history of co-operations.

The technology disclosed in JP-A 2004-258802 (KOKAI), however, is intended for document management within a registered meeting or group. Because the management body needs to be registered in advance, the process load is increased. In addition, because the documents are placed under the management of the meeting or group and browsed under this management, a search cannot be made by using a communication situation as a keyword as in the above case.

Contrary to the technology of JP-A 2004-258802 (KOKAI), a method of actively recognizing and managing the communication situations of the users based on an operation condition of devices may be adopted, without requiring advance registration of a group or the like. However, if a single machine is configured to perform information management for a number of users as in the technology disclosed in JP-A 2004-258802 (KOKAI), all the operations of the users have to be detected and all the speakers have to be identified on the single machine. This makes the structure of the machine too complicated.

SUMMARY OF THE INVENTION

A device for managing a communication situation indicating a relationship among users, according to one aspect of the present invention, includes an action storage unit that has a capacity to store action information indicating each action of the users; a first storage unit that stores therein an action determining rule in which operation information indicating an operation content for an operation terminal that is operable by a first user in the users is associated with first action information in the action information indicating an action of the first user; a second storage unit that stores therein a communication situation determining rule in which the action information is associated with a communication situation indicating a relationship between the action of the first user and an action of a second user in the users; an operation receiving unit that receives the operation information; an action acquiring unit that acquires the action information corresponding to the operation information from the first storage unit and stores acquired action information in the action storage unit; a receiving unit that receives, via a network, second action information of the second user in the action information from an external device that manages the action of the second user; a situation acquiring unit that acquires, from the second storage unit, the communication situation corresponding to the action information received by the receiving unit; and a writing unit that writes the first action information indicated by the communication situation to the action storage unit, additionally.

A method of managing a communication situation indicating a relationship among users, according to another aspect of the present invention, includes storing, in a first storage unit, an action determining rule in which operation information indicating an operation content for an operation terminal that is operable by a first user in the users is associated with first action information in action information, which indicates action of the users, indicating an action of the first user; storing, in a second storage unit, a communication situation determining rule in which the action information is associated with a communication situation indicating a relationship between the action of the first user and an action of a second user in the users; receiving the operation information; acquiring the action information corresponding to the operation information from the first storage unit and storing acquired action information in an action storage unit having a capacity to store the action information; receiving, via a network, second action information of the second user in the action information from an external device that manages the action of the second user; acquiring, from the second storage unit, the communication situation corresponding to the action information received at the receiving; and writing the first action information indicated by the communication situation to the action storage unit, additionally.

A computer-readable recording medium according to still another aspect of the present invention stores therein a computer program for managing a communication situation indicating a relationship among users. The computer program causes a computer to execute storing, in a first storage unit, an action determining rule in which operation information indicating an operation content for an operation terminal that is operable by a first user in the users is associated with first action information in action information, which indicates action of the users, indicating an action of the first user; storing, in a second storage unit, a communication situation determining rule in which the action information is associated with a communication situation indicating a relationship between the action of the first user and an action of a second user in the users; receiving the operation information; acquiring the action information corresponding to the operation information from the first storage unit and storing acquired action information in an action storage unit having a capacity to store the action information; receiving, via a network, second action information of the second user in the action information from an external device that manages the action of the second user; acquiring, from the second storage unit, the communication situation corresponding to the action information received at the receiving; and writing the first action information indicated by the communication situation to the action storage unit, additionally.

BRIEF DESCRIPTION OF THE DRAWINGS

FIG. 1 is a block diagram of a structure of a communication situation managing device according to an embodiment of the present invention;

FIG. 2 is an explanatory diagram for showing examples of action determining rules;

FIG. 3 is an explanatory diagram for showing examples of communication situation determining rules;

FIG. 4 is an explanatory diagram for showing examples of access level determining rules;

FIG. 5 is an explanatory diagram for showing an example of a data structure of action information;

FIG. 6 is an explanatory diagram for showing an example of a data structure of schedule information;

FIG. 8 is an explanatory diagram for showing an example of a content of an action information storage unit;

FIG. 9 is an explanatory diagram for showing another example of the content of the action information storage unit;

FIG. 10 is an explanatory diagram for showing an example of a search screen;

DETAILED DESCRIPTION OF THE INVENTION

Figure 7:
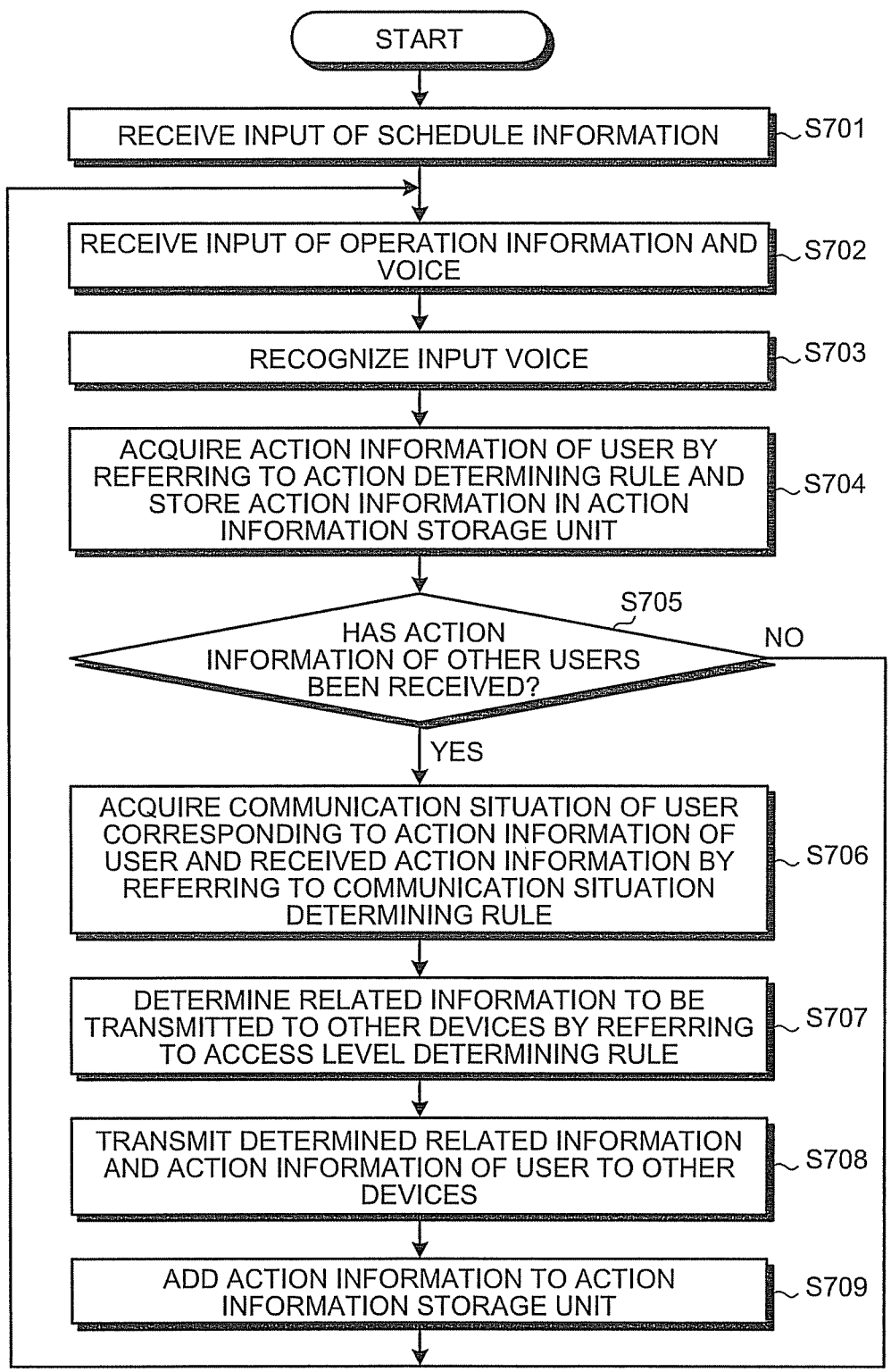
FIG. 7 is a flowchart of a communication situation management process.

Exemplary embodiments of the present invention are explained in detail below with reference to the accompanying drawings.

The communication situation managing device according to an embodiment of the present invention is configured to recognize, based on an action of a user determined from an operation made on a file or the like that the user has referred to or the user's remarks, as well as actions of other users that are received from other devices, each situation of communications with other users, and to manage the communication situations in an accessible manner.

The following description focuses on an example in which the communication situation managing device is realized as a device that is connected to a mobile terminal computer such as a personal computer (PC) to input operations to the mobile computer. With this structure, communication situations can be readily recorded not only in an occasion where information on participants and reference documents is registered and managed in advance by way of a certain number of servers but also in an irregular, unscheduled meeting and discussion where such information is not registered in advance.

The embodiment of the device is not limited to the above, but the communication situation managing device may be realized on the mobile terminal by incorporating the functions into the mobile terminal.

As shown in FIG. 1, a communication situation managing device 100a according to the present embodiment is connected to a PC 200, such as a notebook PC, for presenting a reference document in a communication activity and a communication situation managing device 100b for managing a communication situation of a different user.

The communication situation managing device 100a is connected to the PC 200 and the communication situation managing device 100b by way of a wireless network such as a wireless LAN and a Bluetooth (trademark). The manner of connection is not limited to this, and a wired network such as a cable LAN and the Internet can be adopted, too.

The communication situation managing devices 100a and 100b have the same structure, and thus they are sometimes simply referred to as a communication situation managing device 100. Moreover, the communication situation managing device 100b does not have to be a single device, but can be a plurality of devices corresponding to the number of users. The communication situation managing device 100b is configured to be connected to mobile terminals of other users, but the illustration thereof is omitted from the drawing.

As shown in FIG. 1, the communication situation managing device 100 according to the present invention includes a rule storage unit 131, an action information storage unit 132, a network communicating unit 121, a microphone 122, a schedule receiving unit 101, an operation receiving unit 102, a voice receiving unit 103, a recognizing unit 104, an action acquiring unit 105, a receiving unit 106, a communication situation acquiring unit 107, an adding unit 108, a transmission information determining unit 109, and a transmitting unit 110.

The rule storage unit 131 stores therein various rules for determining actions and communication situations of the user communicating with other users by operating the PC 200. The rule storage unit 131 includes an action determining rule 131a, a communication situation determining rule 131b, and an access level determining rule 131c.

The action determining rule 131a stores therein rules for determining an action of the user based on the operation information that indicates what kind of operation the user has made on the PC 200. As shown in FIG. 2, the action determining rule 131a maintains identifiers that identify the rules (Rule 1, Rule 2 . . . , Rule n), conditions that determine the actions, and information that indicates the actions (hereinafter, "action information") in association with one another.

The drawing illustrates an example of the rule for the identifier Rule 3, by which the action of the user is determined as "speech" when the most recent speech lasts for 3 seconds or longer. If the action satisfies more than one rule, the user is considered as taking more than one action. The invention may be configured to determine the action of the user in accordance with any one of the applicable rules. Determination of the action is not limited to the method employing the action determining rule 131a as shown in FIG. 2, but any method can be adopted as long as the action of the user is determined by use of the input operation information or the like.

The communication situation determining rule 131b illustrated in FIG. 1 stores therein rules for determining the communication situation between the user and other users based on the determined action and the actions of other users received from the communication situation managing device 100b. As shown in the example of FIG. 3, the communication situation determining rule 131b stores therein identifiers that identify the rules, the conditions for determining the communication situations, and the communication situations in association with one another.

For instance, the list in FIG. 3 indicates that, when a partner a of the communication activity is presenting an explanation on a document x, the rule identified by identifier Rule 1 stipulates that the communication situation is "being explained about document x by a". The list may include a rule by which the communication situation is determined by tracing the communication history. For example, as shown in the rule of identifier Rule 2 in the same drawing, a rule may stipulate that, in accordance with the communication situation of the user monitored at every cycle of a certain period of time (every 5 minutes), the beginning of the period is determined to be in a certain situation (attending a meeting), only after the period of time elapses.

The determination of the communication situation, however, is not limited to the method incorporating the communication situation determining rule 131b, as shown in FIG. 3.

The access level determining rule 131c shown in FIG. 1 is configured to store therein rules for determining an access level for other users, who are communication partners, to access any document. The access level indicates how much of the content of the document that has been referred to in a communication activity should be put on view. For example, access levels may include levels at which all information is provided without condition, at which only file names and pages that are already presented, at which only IDs that identify the documents are provided.

As shown in an example of FIG. 4, the access level determining rule 131c stores therein identifiers that identify rules, conditions that other users, or communication partners, should satisfy, and access levels specified as a result of determination, in association with one another. The determination of access levels is not limited to the method incorporating the access level determining rule 131c of FIG. 4, however.

The action information storage unit 132 shown in FIG. 1 sequentially stores therein information on actions of the user for which the determined communication situation is taken into consideration. The stored action information can be referred to at any timing by the communication situation acquiring unit 107.

As shown in an example of FIG. 5, the action information storage unit 132 stores therein starting times and dates, end times and dates, information indicating actions of users (action information), names of meetings, places of meetings, communication partners, reference IDs that identify documents that are referred to, names of the documents, and access levels, in association with one another.

The starting time and date indicates the time and date on which the corresponding action begins. The end time and date indicates the time and date on which the corresponding action is terminated. The end time and date is input if required, such as for an action that takes the user a certain period of time to complete, including an operation of editing a document. A value for the access level is written in when the transmission information determining unit 109, which will be described later, determines the access level.

A space for the end date and time of an action is left blank at the time of recording the start date and time of the action because the end date and time is not yet determined. The space is provided, however, so that it may be filled in later if necessary. Columns for the name and place of a meeting are not included when the communication activity is not a meeting. Furthermore, if there is no communication partner or no attendees of a meeting, or if such a person cannot be identified, the space for "partner" is left blank. Thus, what is recorded in the action information storage unit 132 when the user is not engaged in communications with other users is the same as the history of actions of an individual, including historic records of operations.

The items stored in the action information storage unit 132 are not limited to the above, but divisions that the users belong to and the contents of speeches may be recorded.

For the rule storage unit 131 and the action information storage unit 132, any recording medium that is generally used, such as a hard disk drive (HDD), an optical disk, a memory card, and a random access memory (RAM), may be adopted.

The network communicating unit 121 in FIG. 1 is configured to transmit and receive information to and from the PC 200. The network communicating unit 121 includes a wireless interfacing function in correspondence with a wireless networking system in use, such as the wireless LAN and Bluetooth. The microphone 122 is a unit through which the voice of the user is input.

The schedule receiving unit 101 receives schedule information input from the PC 200 via the network communicating unit 121. The schedule information indicates the schedule of the user's actions. According to the present embodiment, the input of the schedule information is received immediately after the startup of the device or before the beginning of a communication activity. The timing of input is not limited thereto, however. The device may be configured in such a manner that the schedule information can be input at any timing. Alternatively, the actions of the user may be determined, without inputting it, based on other related information only.

As schedule information, the start time and date of an action, the end time and date of the action, the name of the action, and the place of the activity are input in association with one another, as shown in an example of FIG. 6. If there are attendees such as in a meeting, an attendee ID list, which is a list of IDs that identify the attendees, is also input. The input schedule information is stored in a storage unit that is not shown in the drawing so that the action acquiring unit 105 described later can refer to it when determining the action of the user.

The operation receiving unit 102 in FIG. 1 receives operation information from the PC 200 by way of the network communicating unit 121. The operation information indicates what operation is made by the user on the PC 200. The operation receiving unit 102 receives, for example, operation information represented by the operation of keys detected in an application running on the PC 200 or information on a document displayed on the application. In addition, the operation receiving unit 102 receives operation information showing what operation is performed by a not-shown human interface device included in the PC 200, such as a keyboard and a mouse.

The voice receiving unit 103 converts the voice input through the microphone 122 to an electrical signal (voice data), and then executes an analog/digital (A/D) conversion on the voice data. The voice receiving unit 103 thereby outputs the converted digital data in a pulse code modulation (PCM) format or the like. This process may be realized by the same method as the conventionally employed process of digitizing audio signals.

The recognizing unit 104 analyzes the voice data output by the voice receiving unit 103 and outputs the result of voice recognition. More specifically, the recognizing unit 104 analyzes the voice data to extract the features necessary for the recognition, and outputs, as the recognition result, a word or a word string that is acoustically the most analogous to the voice data with reference to the dictionary compiled in advance through training. The recognizing unit 104 determines the segment that corresponds to the recognition result as the user's speech segment and outputs the segment.

In the voice recognition process of the recognizing unit 104, any conventionally used method, including a hidden Markov model, a neural network, and dynamic programming (DP) matching, may be adopted.

Because several different users' voices may be input into the microphone 122 at a time, the recognizing unit 104 may be configured to identify the speaker of the speech in accordance with the conventionally used speaker recognition technology so that only the speech of the user of the PC 200 can be picked up for the process.

The action acquiring unit 105 determines the action of the user at any timing, based on the information input from the schedule receiving unit 101, the operation receiving unit 102, and the voice receiving unit 103. More specifically, the action acquiring unit 105 refers to the action determining rule 131*a*, and, when the input information satisfies the conditions of the rules, the action acquiring unit 105 acquires the action corresponding to the conditions and determines it as the action of the user.

In FIG. 2, according to the rule of identifier Rule 3, for example, the latest action of the user is determined as "speech" when the speech lasts for 3 seconds or longer. Thus, when the length of the speech segment detected by the recognizing unit 104 is, for example, 3 seconds or longer, the action acquiring unit 105 determines that the action of the user is "speech".

The receiving unit 106 receives action information of an outside user from the communication situation managing device 100*b* that manages the communication situation of the user. In particular, the receiving unit 106 receives action information from a device whose radio signal has a level higher than a threshold. The system may be configured in such a manner that the action information is received from devices in the same subnet. In other words, the target range may be determined with a physical boundary or a logical boundary. Alternatively, the target communication partners may be users who are registered in advance only.

The communication situation acquiring unit 107 determines the situation of the communication between the user and another user, based on the action information of the user determined by the action acquiring unit 105 and the action information of the other user received by the receiving unit 106. More specifically, the communication situation acquiring unit 107 refers to the communication situation determining rule 131*b*, and, when at least one of the determined action information of the user and the received action information of the other user satisfies the condition of the rule, the communication situation acquiring unit 107 obtains the situation corresponding to the condition and determines it as the communication situation.

When the receiving unit 106 receives the action information indicating that the other user is giving an explanation on a document x, the condition of the rule for the identifier Rule 1 in FIG. 3 is satisfied. Hence, the corresponding situation "other user explaining document x" is determined as the communication situation.

The communication situation acquiring unit 107 also performs a process of converting the received action information of the other user to the action information of the user of the device of its own and storing the converted information in the action information storage unit 132. In this process, the communication situation acquiring unit 107 converts the action information of the other user to the action information of its own user by changing an active phrase of the received action information to a passive phrase, and a passive phrase to an active phrase.

For instance, when the action information of the other user is "speech", the communication situation acquiring unit 107 converts the action information to "listening to explanation". Further, the communication situation acquiring unit 107 converts "showing" to "shown". For the conversion, any method, such as consulting a table on which phrases before and after the conversion are brought into correspondence with each other, may be employed.

The adding unit 108 refers to the determined communication situation and adds action information to the action information storage unit 132. For instance, the adding unit 108 adds the action information with the converted passive phrase to the action information storage unit 132. Further, when the stored action information indicating "speech" is found to be an speech made in a particular meeting, the adding unit 108 adds the name of the meeting that is to be filled in a space for the name of the meeting in the action information.

The transmission information determining unit 109 determines related information that is to be transmitted together with the action information of the user determined by the action acquiring unit 105. The related information includes information related to the action of the user, such as the document ID of a document referred to during the communication activity, the title of the document, and the user ID that identifies the user.

The user ID may be retrieved from the storage unit of the device (not shown) storing therein the user ID in advance, or may be a verified user ID obtained by performing verification of the user at the time of starting up the device. To verify the user, the verifying process may be conducted by using biological information.

The transmission information determining unit 109 first refers to the access level determining rule 131*c* to look for a condition that the other user, or the communication partner, satisfies. When there is a condition that is satisfied, the transmission information determining unit 109 obtains the access level that corresponds to this condition. Then, the transmission information determining unit 109 determines related information that corresponds to the obtained access level as information that is to be transmitted.

If the other user is included in the registration list, the condition of the rule of identifier Rule 1 in FIG. 4 is satisfied. The transmission information determining unit 109 therefore obtains "accessible without condition" as the access level. Then, the document ID and the title of the document may be determined to be transmitted together as related information. The registration list denotes information formed in a list of preliminarily registered users to whom the documents are accessible without condition.

The transmitting unit 110 associates the action information determined by the action acquiring unit 105 with the related information determined by the transmission information determining unit 109 and transmits the information to the communication situation managing device 100b used by the other user, or the communication partner. In a similar manner to the receiving unit 106, the transmitting unit 110 transmits the action information to devices that are located within a predetermined range.

A communication situation managing process employing the communication situation managing device 100 according to the present embodiment as designed above is explained next with reference to FIG. 7.

Upon startup of the device, the schedule receiving unit 101 receives the schedule information input from the PC 200 by way of the network communicating unit 121 (step S701). At the startup, the input of voice and operation information is also initiated. The process from step S702 to step S712 is repeated when the input of voice or operation information is received.

At step S702, the operation receiving unit 102 receives the input of the operation information from the PC 200 by way of the network communicating unit 121. Alternatively, the voice receiving unit 103 receives the input of voice from the microphone 122 (step S702). When the input of voice is received, the recognizing unit 104 recognizes the input voice (step S703).

Next, the action acquiring unit 105 acquires the action information corresponding to the input schedule information, the operation information, and the condition that the voice recognition result satisfies, while referring to the action determining rule 131a. The action acquiring unit 105 stores the acquired information in the action information storage unit 132 (step S704).

Then, whether the receiving unit 106 receives the action information of any other user from an outside communication situation managing device 100b is determined (step S705). When the action information is received (yes at step S705), the communication situation acquiring unit 107 acquires the communication situation of the user that corresponds to the action information of the user and the received action information, while referring to the communication situation determining rule 131b (step S706).

At this step, the communication situation acquiring unit 107 converts the received action information to the action information of the user of its own device and stores the converted information in the action information storage unit 132. It should be noted, however, that the action information of other users may not be always converted or stored. For instance, when the action information indicating that an outside user is making a speech is received but whether the conversation partner is the user of its own device cannot be determined, the converting and storing process is not performed.

Thereafter, the transmission information determining unit 109 acquires the access level of the other user, while referring to the access level determining rule 131c, and then determines the related information that is to be transmitted to the outside communication situation managing device 100b, in accordance with the access level (step S707).

Next, the transmitting unit 110 associates the determined related information with the action information of the user determined at step S704 and transmits the information to the outside communication situation managing device 100b (step S708). In the outside communication situation managing device 100b, the action information of the user of the communication situation managing device 100a is input so that the communication situation of the other user can be determined based on the input action information.

The adding unit 108 refers to the determined communication situation and adds information to the action information storage unit 132 (step S709). For instance, when it is determined according to Rule 2 in FIG. 3 that the user has been attending a meeting since 5 minutes ago, the adding unit 108 adds the name of the meeting and communication partner to the corresponding action information history in accordance with the adding procedure described in the parentheses in Rule 2.

After the action information is added, or when it is determined at step S705 that no action information of other users is received from any outside communication situation managing device 100b (no at step S705), the system returns to step S702, where the process is repeated. The communication situation managing process is terminated when an instruction of shutting down the device or the like is received, although it is not shown in the drawings.

According to the present embodiment, the communication situation managing device 100 for each user recognizes the situation of the communication in which the user participates, and the situation is recorded as a historical record of action information in the action information storage unit 132. In addition, the information on the communication situation recognized by each device is transmitted to and received from one another so that the information can be used for the determination of the communication situation of its own device. This reduces the load of the central control process executed on a single device that manages the communication situations of a number of users, and the management of the communication situations can be realized with a simple structure.

Examples of the communication situation managing process according to the present embodiment are now explained with reference to FIGS. 8 and 9. FIGS. 8 and 9 are explanatory diagrams for showing examples for the content of the action information storage unit 132. In these examples, the communication situations of users who attend a meeting are recognized and managed. It is assumed that the rule storage unit 131 stores therein rules as shown in FIGS. 2 to 4.

First, the description focuses on the communication situation managed by a communication recognizing device (hereinafter, "device") used by user A immediately after the beginning of a meeting that users A and B whose user IDs are "suzuki" and "tanaka", respectively are attending.

At this moment, the device has not yet detected devices that other attendees including user B are using. Even if detected, the device cannot determine whether the users are really attending the meeting or merely passing by the place because only short time has elapsed. This is because, as shown in Rule 2 of FIG. 3, the users are regarded as attendees of the meeting only after a predetermined period of time (5 minutes) passes.

For the above reason, as shown in FIG. 8, spaces for the name and place of the meeting and the communication partner yet to be detected are left blank, while information acquired singly from the device used by user A such as user A's speeches and operations are stored into the action information storage unit 132.

A predetermined period of time (5 minutes) after the meeting begins, the condition of Rule 2 is satisfied, and thus user B is recognized as an attendee of the meeting. Because Rule 2 stipulates that the person has been attending the meeting since 5 minutes before, the history of action information is traced back 5 minutes before. For the communication partner, "tanaka" is added, and information on the meeting, such as the name and place, is also specified. The information on the meeting can be acquired by referring to the schedule information received by the schedule receiving unit 101 as shown in FIG. 6 and finding information on the meeting for which "tanaka" is registered as an attendee.

When user B is recognized as a conversation partner, the device associates the action information of user A that has not been transmitted, with the start time and date and the end time and time of the action and transmits the information to user B. Similarly, when the action information is received from user B, who is another attendee, the communication situation acquiring unit 107 stores the received action information in the action information storage unit 132 as the action information of its own user. In this process, the communication situation acquiring unit 107 changes an active phrase of the received action information to a passive phrase and a passive phrase to an active phrase to store the action information of other users as the action information of its own user.

In the above description, association of information is made under a condition of attendees being listed in the schedule information in advance. However, if attendees are not listed in the schedule information or if a discussion or a meeting that is not included in the schedule takes place, the invention may be configured so that the user can explicitly input the attendees. Moreover, whether a discussion or meeting is taking place may be determined based on the lengths of speeches. For instance, Rule 3 in FIG. 3 may be applied to the following case.

At first, it is difficult for the device of the user to determine whether a device with which the communication situations are exchanged is a conversation partner. Thus, the device of the user transmits action information "speech" associated with the start time and date and the end time and date of this action, to the target device. Similarly, only action information "speech" associated with the start time and date and the end time and date of the action is received from the counterpart device.

The communication situation acquiring unit 107 compares the time of the received action information with the time of the speech of its own user to figure out the timings of speeches for a certain length of time. When the timings of the speeches can be considered as timings at which the speakers of the conversation are shifted, the counterpart device is recognized as a conversation partner.

How much of the action information is to be transmitted is determined by the transmission information determining unit 109. A situation in which user C (user ID "itoh"), who is an unscheduled attendee, is present at the meeting is considered. In accordance with Rule 3 in FIG. 4, only the document ID ("abc", for instance) that identifies the referred-to file is transmitted to user C. User C is not allowed to find out the name or content of the file. However, when user C searches for "a file presented at the meeting of September 22" on a later day, the user can obtain information necessary to specify the document, such as document ID "abc".

Rule 2 in FIG. 4 stipulates that only pages that are presented at the meeting are accessible. Rule 2 is meant to distinguish such a situation from a situation where all the pages of the file are made accessible when the document includes information that is not dealt with directly as reference information at the meeting.

Through such an exchange of information, names of other attendees, the speech times of other attendees, referred-to documents, and referred-to page numbers of the documents are recorded in the device of each attendee.

An example of making an inquiry to other users by use of the recorded communication situation is now explained with reference to FIGS. 10 and 11.

A situation is considered, in which user C (user ID "itoh") makes an inquiry to user A (user ID "Suzuki") after the meeting about the document that the user A has used during the meeting. According to the present embodiment, information such as a document ID that identifies a related document can be searched for by inputting a communication partner or a communication situation "document presented" as a search keyword. Thus, one can ask a question by specifically designating the target document with the document ID or the like.

FIG. 10 is an explanatory diagram for showing an example of a search screen on which a document is searched for. According to the present embodiment, a document can be searched for by using the place of the meeting, the communication partner, the communication situation, the time and date of the communication activity, or the like as a search keyword. The keywords are not limited to the above, but the name of the meeting, the document ID and other information stored in the action information storage unit 132 may be adopted as search keywords.

User C inputs the user ID of user A "suzuki" for a user name 1001, and "document presented" for a situation 1002, and clicks a search button 1003 to begin the search. FIG. 10 is a diagram for showing an example of the search result that is displayed in response to the operation. User C thereby obtains the file ID "abc" of the file referred to during the communication activity so that user C can make an inquiry to user A by use of the obtained ID.

Figure 11:
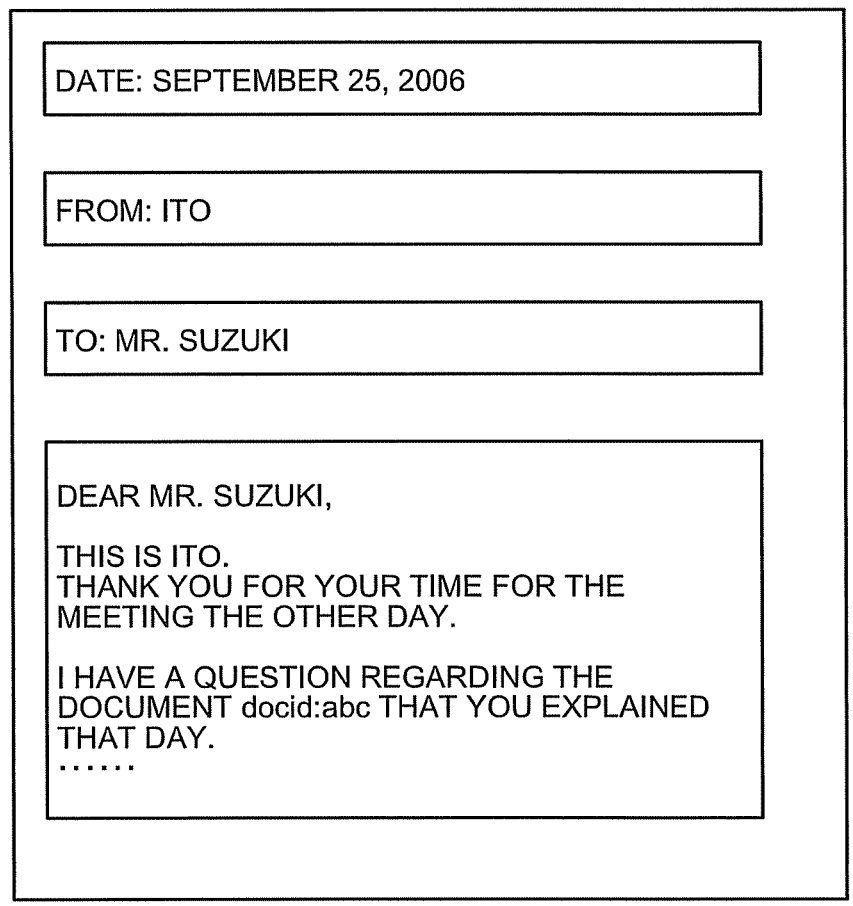
FIG. 11 is an explanatory diagram for showing an example of an inquiry screen.

FIG. 11 is an explanatory diagram for showing an inquiry screen on which an inquiry is made. In this example, an e-mail is adopted to make an inquiry. The file ID is placed after the prefix "docid:" to indicate that it refers to the file.

The IDs may not be in a readable form for users. The user who receives the inquiry (user A for user ID "suzuki" in FIG. 11) can refer to the file entity based on the ID "abc" specified in the e-mail and directly open the file. To open the file, the entity may be referred to by way of the ID hyperlinked on the e-mail application. Alternatively, the file may be searched for by inputting the ID on a different search tool.

With such a structure, the users can specify the subject information based on the information obtained by a search using the communication situation as a keyword and also on an inquiry on a document identified with an ID, thereby further conducting communications in a smooth manner.

In the above example, the schedule information, the PC operation information, and voices are input as information for determining the action of the user. However, the action of the user may be determined by use of other kinds of information. For instance, information input from various kinds of sensors, such as video or image information of the user captured by an image-pickup device such as a camera and positional information obtained by a global positioning system (GPS), may be adopted as information for determining the action of the user.

The communication situation managing device according to the present embodiment recognizes the situation of communications with other users based on the action of the user determined in accordance with the operation of the device and the speech as well as the action of other users received from other devices and manages the information in an accessible manner. Because the communication situation of each user is exchanged between the users, the communication situation can be easily recorded. In other words, the management of the situation of communications with other users can be facilitated.

Furthermore, by recording the communication situations and using any of the communication situations as a key to search for a document or information afterward, an advanced search can be realized. In addition, because the communication situation is used as a key, a person to whom the document is presented can specify the document when making an inquiry thereon to a person who has presented the document, without knowing details of the presented document.

The hardware structure of the communication situation managing device according to the present embodiment is explained below with reference to FIG. 12.

Figure 12:
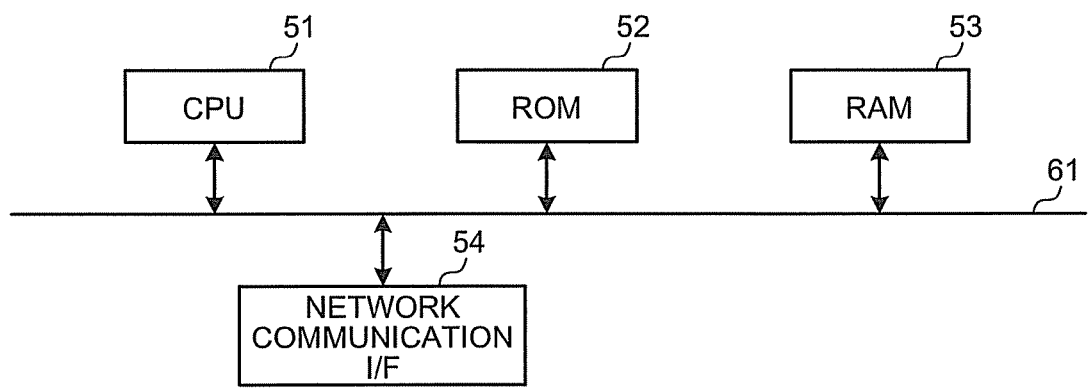
FIG. 12 is an explanatory diagram of a hardware configuration of the communication situation managing device.

The communication situation managing device according to the present embodiment includes a controlling device such as a central processing unit (CPU) 51, a storage device such as a read only memory (ROM) 52 and a RAM 53, a network communication interface 54 making a connection to a network to perform communications, and a bus 61 connecting these units to one another, as shown in FIG. 12.

The communication situation management program executed by the communication situation managing device according to the present embodiment is incorporated and offered in the ROM 52 or the like in advance.

The communication situation management program executed by the communication situation managing device according to the present embodiment may be recorded and offered as a file in an installable or executable format on a computer-readable recording medium such as a compact disk read only memory (CD-ROM), a flexible disk (FD), a compact disk recordable (CD-R), and a digital versatile disk (DVD).

Further, the communication situation management program executed by the communication situation managing device according to the present embodiment may be stored on a computer connected to a network such as the Internet and downloaded via the network. Alternatively, the communication situation management program executed by the communication situation managing device according to the present embodiment may be provided or distributed via a network such as the Internet.

The communication situation management program executed by the communication situation managing device according to the present embodiment is constituted as a module including the units described above (the schedule receiving unit, the operation receiving unit, the voice receiving unit, the recognizing unit, the action acquiring unit, the receiving unit, the communication situation acquiring unit, the adding unit, the transmission information determining unit, and the transmitting unit). As an actual hardware structure, the CPU 51 reads the communication situation management program from the ROM 52 and executes it so that all the units are loaded onto and generated in the main storage device.

The method, the device, and the computer product according to the present invention for managing the communication situations are suitable for a device, method, and program for managing information related to communication activities such as irregular meetings and discussions in a searchable fashion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for decentrally managing a communication situation indicating a relationship among users, comprising:
an action storage unit;
a first storage unit that stores therein an action determining rule in which operation information indicating an operation for an operation terminal operable by a first user is associated with first action information, the first action information indicating an action of the first user;
a second storage unit that stores therein a communication situation determining rule in which second action information is associated with a communication situation indicating a relationship between the action of the first user and an action of a second user, the second action information indicating an action of the second user;
an operation receiving unit that receives the operation information;
an action acquiring unit that acquires the first action information corresponding to the operation information from the first storage unit and stores acquired first action information in the action storage unit;
a receiving unit that receives, via a network, the second action information of the second user from an external device that manages the action of the second user;
a situation acquiring unit that acquires, from the second storage unit, the communication situation corresponding to the second action information received by the receiving unit and generates new first action information, wherein the new first action information generated by the situation acquiring unit expresses the second action information as action information of the first user by converting an active expression included in the second action information received by the receiving unit into a passive expression and converting a passive expression included in the second action information received by the receiving unit into an active expression, wherein the situation acquiring unit effectuates decentralized management of the communication situation by managing action information from the second user as action information of the first user; and
a writing unit that refers to acquired communication situation in the situation acquiring unit and records the new first action information acquired from the situation acquiring unit, in the action storage unit, additionally.

2. The device according to claim 1, wherein
a method of writing the first action information is further associated in the communication situation determining rule, and
the writing unit acquires, from the second storage unit, the method of writing the first action information corresponding to the communication situation acquired by the situation acquiring unit, and records the first action information according to an acquired method of writing the first action information, additionally.

3. The device according to claim 1, further comprising a voice receiving unit that receives an input of a voice from the first user, wherein
  at least one of the operation information and the voice is associated with the first action information in the action determining rule, and
  the action acquiring unit acquires, from the first storage unit, the first action information corresponding to at least one of input operation information and an input voice, and stores acquired first action information in the action storage unit.

4. The device according to claim 3, further comprising a recognizing unit that analyzes the input voice, and recognizes a content of a speech, wherein
  at least one of the operation information and the content of the speech is associated with the action information in the first action determining rule, and
  the action acquiring unit acquires, from the first storage unit, the action information corresponding to at least one of the input operation information and a recognized content of the speech, and stores acquired first action information in the action storage unit.

5. The device according to claim 3, further comprising a recognizing unit that analyzes the input voice, and recognizes an interval of a speech of the first user, wherein
  at least one of the operation information and the interval of the speech is associated with the first action information in the action determining rule, and
  the action acquiring unit acquires, from the first storage unit, the first action information corresponding to at least one of the input operation information and a recognized interval of the speech, and stores acquired first action information in the action storage unit.

6. The device according to claim 1, further comprising a schedule receiving unit that receives an input of schedule information indicating a schedule of the action of the first user, wherein
  at least one of the operation information and the schedule information is associated with the first action information in the action determining rule, and
  the action acquiring unit acquires, from the first storage unit, the first action information corresponding to at least one of the input operation information and input schedule information, and stores acquired first action information in the action storage unit.

7. The device according to claim 1, further comprising a transmitting unit that transmits the first action information acquired by the action acquiring unit to the external device.

8. The device according to claim 7, wherein the transmitting unit associates the first action information acquired by the action acquiring unit with related information of the action including information on a document referred to by the first user, and transmits associated information to the external device.

9. The device according to claim 8, further comprising a transmission information determining unit that determines the related information to be transmitted to the second user according to a predetermined rule, wherein
  the transmitting unit associates the first action information acquired by the action acquiring unit with the related information determined by the transmission information determining unit, and transmits associated information to the external device.

10. The device according to claim 1, wherein the new first action information generated by the situation acquiring unit expresses the second action information as the first action information by the first user by converting the second action information of the second user into the first action information of the first user as first user's own action information, and
  the writing unit records the new first action information in the action storage unit, additionally.

11. A method of decentrally managing a communication situation indicating a relationship among users, comprising:
  storing, in a first storage unit, an action determining rule in which operation information indicating an operation for an operation terminal operable by a first user is associated with first action information, the first action information indicating an action of the first user;
  storing, in a second storage unit, a communication situation determining rule in which second action information is associated with a communication situation indicating a relationship between the action of the first user and an action of a second user, the second action information indicating an action of the second user;
  receiving the operation information;
  acquiring the first action information corresponding to the operation information from the first storage unit and storing acquired first action information in an action storage unit;
  receiving, via a network, the second action information of the second user from an external device that manages the action of the second user;
  acquiring, from the second storage unit, the communication situation corresponding to the second action information received at the receiving and generating new first action information, wherein the new first action information generated expresses the second action information as action information of the first user by converting an active expression included in the second action information received into a passive expression and converting a passive expression included in the second action information received into an active expression, wherein decentralized management of the communication situation is effectuated by managing action information from the second user as action information of the first user; and
  referring to acquired communication situation and recording the new first action information acquired from the situation acquiring unit, in the action storage unit, additionally.

12. A non-transitory computer-readable recording medium that stores therein a computer program for decentrally managing a communication situation indicating a relationship among users, the computer program causing a computer to execute:
  storing, in a first storage unit, an action determining rule in which operation information indicating an operation for an operation terminal operable by a first user is associated with first action information, the first action information indicating an action of the first user;
  storing, in a second storage unit, a communication situation determining rule in which second action information is associated with a communication situation indicating a relationship between the action of the first user and an action of a second user, the second action information indicating an action of the second user;
  receiving the operation information;
  acquiring the first action information corresponding to the operation information from the first storage unit and storing acquired first action information in an action storage unit;
  receiving, via a network, the second action information of the second user from an external device that manages the action of the second user;

acquiring, from the second storage unit, the communication situation corresponding to the second action information received at the receiving and generating new first action information, wherein the new first action information generated expresses the second action information as action information of the first user by converting an active expression included in the second action information received into a passive expression and converting a passive expression included in the second action information received into an active expression, wherein decentralized management of the communication situation is effectuated by managing action information from the second user as action information of the first user; and referring to acquired communication situation and recording the new first action information acquired from the situation acquiring unit, in the action storage unit, additionally.

* * * * *